United States Patent [19]

Abrams et al.

[11] 4,388,283

[45] Jun. 14, 1983

[54] SO$_2$ REMOVAL

[75] Inventors: Jack Z. Abrams; Robert M. Sherwin, both of San Rafael, Calif.

[73] Assignee: Bechtel International Corporation, San Francisco, Calif.

[21] Appl. No.: 349,728

[22] Filed: Feb. 18, 1982

Related U.S. Application Data

[63] Continuation-in-part of Ser. No. 181,315, Aug. 25, 1980, abandoned, which is a continuation of Ser. No. 406, Jan. 2, 1979, Pat. No. 4,246,245.

[51] Int. Cl.$^3$ .............................................. C01B 17/00
[52] U.S. Cl. ..................................... 423/242; 423/244
[58] Field of Search .......... 423/242 A, 242 R, 244 A, 423/244 R, 512 A

[56] References Cited

U.S. PATENT DOCUMENTS

| | | | |
|---|---|---|---|
| 2,090,143 | 8/1937 | Nonhebel et al. | 423/242 |
| 2,718,453 | 9/1955 | Beckman | 423/512 A |
| 3,929,968 | 12/1975 | Taub | 423/242 |
| 3,932,587 | 1/1976 | Grantham et al. | 423/242 |

OTHER PUBLICATIONS

Chemistry and Technology of Lime and Limestone Boynton, 1965.

*Primary Examiner*—O. R. Vertiz
*Assistant Examiner*—Gregory A. Heller
*Attorney, Agent, or Firm*—Townsend and Townsend

[57] ABSTRACT

Improved methods are provided for the efficient and economic removal of sulfur dioxide from gases, which comprise contacting the gas with neutralizing values obtained from Type S hydrated lime, i.e. calcined dolomite, slaked with water under elevated temperature and pressure. The Type S hydrated dolomitic lime may be used in conjunction with a wet scrubber to provide base and neutralizing magnesium values, in a spray dryer or dry scrubber, or directly introduced into the boiler. The use of Type S hydrated dolomitic lime greatly enhances the efficiency of sulfur dioxide removal, providing for enhanced utilization of base values and more rapid rate of reaction.

3 Claims, No Drawings

4,388,283

SO₂ REMOVAL

CROSS-REFERENCE TO RELATED APPLICATIONS

This application is a continuation-in-part of application Ser. No. 181,315, filed Aug. 25, 1980, now abandoned which in turn was a continuing application of application Ser. No. 406, filed Jan. 2, 1979, now U.S. Pat. No. 4,246,245 both of whose disclosures are incorporated herein by reference.

BACKGROUND OF THE INVENTION

1. Field of the Invention

Sulfur is found admixed with a wide variety of fossil fuels and metal ores. When oxidizing the naturally occurring minerals and fuels through heating or burning, the sulfur oxidation product is sulfur dioxide. Sulfur dioxide is a serious pollutant, since in itself it forms sulfurous acid, which in itself and also upon oxidation to sulfuric acid causes serious contamination and injurious effects to the environment.

One of the ways to prevent sulfur dioxide in waste gases from being vented to the atmosphere is to treat sulfur dioxide containing gaseous effluents with base, either in the liquid or vapor phase. Various bases have been used, such as soda ash, lime and the like.

There are a number of considerations in the choice and manner in which the base is employed. The first consideration is economics. There are a number of factors involved with the economics. One factor is the cost of the alkaline or basic material. A second factor is the efficiency of the alkaline material. The less efficient the material, the more costly the removal of sulfur dioxide will be, in requiring greater amounts than stoichiometric to provide for the desired reduction in sulfur dioxide in the effluent and in requiring larger plant, particularly storage, metering and recovery equipment. A third consideration is the degree to which the sulfur dioxide may be removed with a given amount of the base.

Besides the base which is employed, another consideration is the equipment required for processing and the effect of the materials employed on the equipment. There is also the nature of the sludge or residue and the manner in which the residue may be disposed of, as well as the condition e.g., temperature, of the effluent gas.

In developing a process for removing sulfur dioxide from effluent gases, normally flue gases, all of the above considerations are involved for an effective process. In view of the very large volumes of gas which exit from power plants, processing plants, and other installations burning or oxidizing sulfur containing materials, small improvements in efficiency can result in dramatic savings. It is therefore desirable to provide for simple and efficient processes utilizing comparatively inexpensive materials, which can rapidly reduce sulfur dioxide content in waste gases and the like to acceptable levels while producing residues which are readily disposable.

2. Description of the Prior Art

Type S hydrated dolomitic lime, which is prepared from calcined dolomite, is available as a structural material from Flintkote Lime Products. Description of the preparation of Type S hydrated lime may be found in Boynton, *Chemistry and Technology of Lime and Limestone,* Interscience Publishers, New York, 1965, pages 167, 288-9, 302-307, 317-318, and 333-338. U.S. Pat. No. 4,046,856 describes a sulfur dioxide removal process employing magnesium with recycling of the magnesium as magnesium hydroxide. Other patents of interest describing processing of flue gas with basic materials include U.S. Pat. Nos. 2,068,882, 3,883,639, 3,941,378, 3,919,393, 3,991,172, 4,011,299, and 4,018,868. See also, C.A. 81, 6803u, 82, 63922r, 82 174821b, 84, 155093r, 84, 155095t and Ger. Offen. 2,412,372.

SUMMARY OF THE INVENTION

An improved method is provided for the removal of sulfur dioxide from sulfur dioxide containing gases, particularly flue gases from the burning of fossil fuels, which comprises contacting the gases with a sufficient amount of sulfur dioxide neutralizing values derived from Type S hydrated dolomitic lime to substantially reduce the sulfur dioxide content of the gas. The contacting can be carried out under various conditions, such as a wet scrubber, spray drying, or boiler injection, where the sulfur dioxide is rapidly and efficiently neutralized to a product, which may be further treated to provide an environmentally acceptable waste product.

In one embodiment, employing a wet scrubber, Type S hydrated dolomitic lime is employed as a source of magnesium sulfite which reacts with sulfur dioxide to provide a mixture of magnesium sulfite-bisulfite. A sidestream containing the magnesium sulfite-bisulfite is oxidized to sulfate, and the magnesium sulfate converted to magnesium hydroxide, which is combined with the wet scrubber effluent to provide magnesium sulfite.

In the "dry" removal of sulfur dioxide from flue gases, a dispersion of Type S dolomitic lime is sprayed into the hot flue gases as fine particles in an amount and at a rate which provides for the desired level of sulfur dioxide reduction while maintaining the temperature of the effluent sufficiently above adiabatic saturation to avoid condensation. Use of the Type S hydrated dolomitic lime avoids recycling of partially spent neutralizing values, while providing efficient sulfur dioxide neutralization over a wide range of sulfur dioxide concentrations and rapid reaction allowing for smaller equipment and ease of operation.

DESCRIPTION OF THE SPECIFIC EMBODIMENTS

An improved and highly efficient method is provided for the removal of sulfur dioxide from sulfur dioxide containing gases, particularly flue gases, which comprises contacting the sulfur dioxide containing gas with a sufficient amount of sulfur dioxide neutralizing values derived from Type S hydrated dolomitic lime. The Type S hydrated dolomitic lime may be used directly or indirectly, by itself or in combination with other alkaline values. Both wet and dry techniques may be employed, such as wet scrubbing, spray drying, and boiler injection.

The sulfur dioxide neutralizing values are at least in part derived from Type S hydrated dolomitic lime, which is calcined dolomite, hydrated under conditions of elevated temperatures and pressures. As provided by Flintkote, Type S hydrated dolomitic lime has a calcium hydroxide content of about 55%, magnesium hydroxide content of about 40%, magnesium oxide content of about 2% and water of about 0.2%. The settling rate to ½ volume in minutes, (ASTM C-110) is about 225, while the specific gravity is 2.24. The sieve analysis shows that 100% of the particles passed 20 mesh, while 79% of the particles pass 325 mesh.

As described in *Chemistry and Technology of Lime and Limestone,* supra, page 336, Type S dolomitic lime is hydrated in an autoclave at pressures of from about 25 to 150 psi, and temperatures from about 250° to 400° F.

In the subject method, a sulfur dioxide containing gas is contacted with sulfur dioxide neutralizing values derived at least in part from Type S hydrated dolomitic lime where essentially all magnesium present is derived from Type S hydrated dolomitic lime, the total sulfur dioxide neutralizing values being present in sufficient amount to reduce the level of sulfur dioxide in the flue gas to substantially less than about 10% of the original level, preferably less than about 70 ppm, more usually to a value below about 55 ppm.

Depending upon the mode employed for sulfur dioxide removal, the Type S hydrated dolomitic lime will normally be employed as a powder or slurry. The amount of solids in the slurry will also vary depending upon the mode of sulfur dioxide reduction employed. Usually solids content in slurries for wet scrubbing will be at least about 10 weight percent, more usually at least about 40 weight, and generally not more than about 80 weight percent.

The wet scrubbing method for sulfur dioxide removal will be considered first. In general terms, the sulfur dioxide containing flue gas is contacted with a magnesium sulfite solution in a scrubbing zone at a pH in the range of about 6–7.5 to produce magnesium bisulfite. The scrubbing zone effluent is divided into two streams, a major cycle stream, and a minor regeneration stream. The regeneration stream is subjected to oxidation to oxidize bisulfite and sulfite to sulfate and at least a major portion of the oxidized solution made alkaline with Type S hydrated dolomitic lime and other hydrated lime to produce magnesium hydroxide and inert insoluble calcium sulfate. The basic stream is then combined with the major recycle stream to neutralize the magnesium bisulfite to magnesium sulfite and restore lost magnesium values. A second minor side stream is taken from the regeneration stream between the scrubber effluent and alkalization, usually from the recycle tank or oxidizer, as a solids removal stream, which is separated into a sludge fraction rejected and the liquid fraction, with the sludge fraction rejected and the liquid fraction combind with the major recycle stream.

The subject wet scrubbing method provides many advantages: calcium is not present as an absorbent in the scrubber which avoids scaling; only minor amounts of environmentally undesirable soluble magnesium salts are discharged; efficient utilization of sulfur dioxide neutralizing values is achieved; all of the absorption and neutralization reactions are rapid due to the use of Type S hydrated dolomitic lime and regenerated magnesium as absorbent, so that the rapidity of the reactions coupled with the efficient use of the neutralizing values allows for smaller equipment; and sulfur dioxide is efficiently removed from the gas stream to environmentally acceptable values.

While Type S hydrated dolomitic lime has many advantages as described above, the subject wet scrubbing process could use any source of make-up magnesium which is convertible, either directly or indirectly, to magnesium sulfite.

The wet scrubbing operation will now be considered in greater detail. A wet scrubbing unit may be employed of conventional design, such as a venturi-type wet scrubbing unit, a spray absorber, a packed tower, a tray tower or the like. Continuously fed to the scrubbing tower is the effluent from the scrubbing tower mixed with an alkaline stream from the reactor, the latter to be described in more detail subsequently. The slurry to the scrubber will contain soluble magnesium sulfite, magnesium bisulfite, magnesium sulfate, insoluble calcium sulfate, and other calcium and magnesium salts, and may also include fly ash or fly ash reactant products. The pH of the slurry will be below 8, generaly in the range of 6 to 7.5. The various insoluble salts will be maintained at a predetermined level of suspended solids. Once the system is in equilibrium, the solids content of the slurry may be maintained fairly constant without significant modification of the various parameters.

A strongly alkaline scrubbing medium is avoided, preventing the formation of basic magnesium carbonate. The magnesium sulfite which is present rapidly and efficiently reacts with the sulfurous acid formed from sulfur dioxide and water to form a magnesium sulfite-bisulfite mixture, resulting in an acidic effluent, with concurrent formation of magnesium sulfate. The pH of the exiting effluent will usually be 6.5 or below. Substantially complete reaction of the sulfur dioxide takes place, so that substantially stoichiometric amounts of the make-up neutralizing materials are provided for the amount of sulfur dioxide removed in the scrubber. Neutralization base values may not only be derived from the magnesium sulfite, but fly ash may provide alkalinity for neutralization of the sulfur dioxide.

After contacting the scrubbing stream, the effluent gas will pass through a mist eliminator. The mist eliminator may be washed with water or individual or combinations of streams from other sources, including the pond return liquor, thickener overflow, or cooling tower blowdown water. The mist eliminator removes entrained solid particles and liquor droplets and the substantially sulfur dioxide free gaseous stream is discharged from the mist eliminator.

The effluent slurry exits from the scrubber to a slurry recycle tank. To the slurry in the slurry recycle tank is added a stream from the reactor tank, which provides the base values for reaction with the sulfur dioxide. The base reacts with the magnesium bisulfite to produce magnesium sulfite and restore the pH to greater than 6.

A portion of the slurry in the slurry recycle tank is removed as a minor side stream and pumped to the oxidizer. The oxidizer is employed to oxidize sulfite to sulfate, primarily magnesium sulfite-bisulfite to magnesium sulfate. Conveniently, oxidation is carried out with compressed air.

A variable bleed stream from the recycle tank or oxidizer, preferably the latter, is directed to the thickener or settling pond. The rate of flow of this sidestream is chosen to provide the desired suspended solids content in the system, generally from about 10 to 15 weight percent. The sludge is dewatered by conventional means. The overflow containing solubles from the sludge separation is transferred to an overflow or holding tank to which is also directed the mother liquor from the sludge dewatering unit, which may be a pond, if the pond is used for sludge dewatering, or a sludge dewatering unit. As indicated previously, the overflow tank contents may be used for washing the mist eliminator.

The reactor tank is employed to provide the desired base or neutralizing values. Into the reactor tank is introduced the stream from the oxidizer, optionally a small underflow slurry stream from the thickener in sufficient amount to maintain the desired concentration of suspended solids, and sufficient alkali. The solids serve as nucleating agents for the rapid formation of particles, inhibiting scale formation. The base is normally Type S hydrated dolomitic lime and other hydrated lime, preferably prepared in substantially the same manner as the Type S hydrated dolomitic lime to enhance its reactivity.

The Type S hydrated dolomitic lime is added in sufficient amount to make up the lost magnesium, which is lost primarily with the sludge. The other hydrated lime, calcium hydroxide, is added in sufficient amount to transform a major portion of the non-absorbent magnesium sulfate to magnesium hydroxide. The combined Type S hydrated dolomitic lime and the calcium hydroxide are added in sufficient amount to provide the necessary base values of magnesium hydroxide to react with the magnesium bisulfite in the recycle tank to provide adequate sulfur dioxide neutralization capacity in the scrubber.

The slurry formed in the reactor is then transferred to the recycle tank to be mixed with the recycle slurry from the scrubber. The slurry may also include, besides the various calcium and magnesium compounds, fly ash or fly ash products. The Type S hydrated dolomitic lime may be added as a powder or slurry or by any other convenient means which provides for the desired concentration in the reactor. By employing specially hydrated calcium oxide, faster reaction can be achieved, so that the residence time in the reactor may be reduced as compared to using normally hydrated lime. However, the special hydration is not required, but provides for a more efficient process.

Turning now to a consideration of the other methods for sulfur dioxide removal, improved results can also be obtained by spray drying or boiler injection with a Type S hydrated dolomitic lime slurry directly injected into the flue gas, where the solids content of the slurry is sufficient to minimize the temperature reduction to less than about 100° F. Normally, exit flue gases will have temperatures in the range of about 250° to about 300° F. A sufficient amount of the Type S hydrated dolomitic lime is introduced to reduce the sulfur dioxide content to the desired level.

As the flue gas passes through a spray dryer, the flue gas is contacted with the Type S hydrated dolomitic lime slurry. Contact times can be very short, normally involving fractions of a second to a few seconds. The flue gas after contact with the Type S hydrated dolomitic lime is then passed through a particle separator, which can be a bag filter, precipitator, cyclone, scrubber, etc. Under the conditions of the neutralization, much of the sulfite which forms will be oxidized to sulfate.

The spray dryer method of removing sulfur dioxide from a flue gas will be described. Commonly, the flue gas which is to be treated will have a flow-rate of about 2.5 to 4 cfm/kw, depending upon the heating value of the fuel and on the amount of excess air. The temperature will normally be in the range of about 240°–350° F., depending upon the sulfur content in the fuel. The lower the flue gas exit temperature, the higher the boiler efficiency. The composition of the gas will normally vary having the following constituents in percent by volume:

| FLUE GAS COMPONENT | RANGE, VOLUME PERCENT |
| --- | --- |
| Carbon Dioxide | 11–16 |
| Oxygen | 2–6 |
| Nitrogen | 66–80 |
| Moisture | 4–12 |
| Sulfur Oxides | 0.04–0.4 |
| Nitrogen Oxides | 0.04–0.08 |

In addition, there will normally be from about 0.01 to 1 weight percent of fly ash.

Without flue gas cleaning, the sulfur dioxide emission would vary from about 400 ppm for low sulfur fuel containing from about 0.3–0.5% sulfur to 4,000 ppm for high sulfur fuel containing 3–5% sulfur. The EPA regulations limit the sulfur dioxide emission for new large units to 1.2 pounds sulfur dioxide/MM BTU and 90% sulfur dioxide removal for high sulfur fuel and to 0.6 pounds sulfur dioxide/MM BTU and 70% sulfur dioxide removal for low sulfur. In some special cases as in a Class I zone, the sulfur dioxide emission is limited to 0.1 pounds sulfur dioxide/MM BTU, which is equivalent to an emission of 50 ppm sulfur dioxide maximum in flue gas.

The Type S hydrated dolomitic lime will be employed at a weight percent of suspended solids in the range of about 3–15%, depending upon the sulfur dioxide concentration in the flue gas. The Type S hydrated dolomitic lime has a low settling rate. The low concentration which can be used offers many advantages. Among these advantages are that the dispersion may be easily atomized to provide fine particles, which permit more efficient utilization of the neutralizing values. In addition, there is substantially reduced concern with clogging of the feed system. Various atomizers can be used, such as rotary atomizers or fluid nozzle atomizers to provide droplets in the range of about 5–50, more usually about 10–25 microns in size. These small diameter particles dry rapidly, so that shorter residence times can be employed in the spray dryer. By contrast, more conventional lime particles are less reactive and require loading to a higher degree in the slurry which in turn introduces more water, and makes it difficult or impossible to use them with high sulfur removal requirements without decreasing the plant efficiency by starting with a higher temperature flue gas.

The slurry will be introduced into the boiler effluent stream at a greater than stoichiometric ratio, generally from about 1.1 to 1.5 mole ratio, more usually from about 1.2 to 1.4 mole ratio,. With the effluent from low sulfur coal, the stoichiometry will generally be about 1.4, while with high sulfur coal, the mole ratio will generally be about 1.1–1.2. The effluent from the spray dryer will generally be at a temperature in the range of about 145° to 165° F.

The particles are blown in a fine mist into the effluent and carried through the spray dryer to a separation zone. The resulting fine particles may be separated by conventional ways, such as bag filters, electrostatic precipitators, combinations thereof, or the like. The particles will be comprised of calcium sulfite and sulfate, magnesium sulfite and sulfate, any unreacted lime, and fly ash, if any. The dry powder can be pneumatically or mechanically conveyed and removed to a waste disposal area, where it may be wetted or pelleted to prevent wind dispersion. The resulting particles which will be a combination of magnesium sulfite and sulfate, which are water soluble, and calcium hydroxide, which has completely reacted due to stoichiometric excess, will react to modify the soluble magnesium salts to insoluble magnesium hydroxide. Thus, the particles will be substantially pollutant free, in that they are substantially insoluble.

In order to demonstrate the advantages of using Type S hydrated dolomitic lime for removal of sulfur dioxide, Type S hydrated dolomitic lime was titrated at a rate of 3 ml/per min with 10% by weight aqueous sulfuric acid to a pH of 6. The lime solution had 10 g of the Type S hydrated dolomitic lime in 90 l ml of water. When pH 6 was reached, approximately 126 ml of sulfuric acid had been added, with 92% of the dolomitic lime neutralized. By comparison, when the same experiment was carried out replacing the Type S hydrated dolomitic lime with Type N hydrated lime, at pH 6, approximately 56 ml of sulfuric acid was added for an alkali utilization of 44%. This experiment demonstrates the much higher efficiency of the Type S hydrated dolomitic lime in neutralizing acid in a short period of time.

In the next study, a wet scrubbing pilot plant was employed, where a small side stream of flue gas was taken upstream from the electrostatic precipitator from a coal burning power plant. The pilot plant employed a conventional venturi scrubber. The process was monitored for sulfur dioxide, pH, and volume flows. Both Type S hydrated dolomitic lime and Type N hydrated lime were tested. The following parameters were maintained: flue gas flow rate in the scrubber was about 3,340 acfm at 250° F. and 13.66 psia; slurry recycle rate was 45 gpm into the venturi (L/G=15) (L—liquid rate gallons/min; G—gas rate, thousands of cubic feet/min) and 55 gpm into the absorption spray (L/G=18) or a total of L/G=33; percent suspended solids in the recycle slurry was about 12% by weight; residence time in the recycle tank was about 8 min; pressure drop in the venturi for fly ash removal was about 17 inches water; mist eliminator washing was about 3 gpm (0.5 gpm/ft$^2$); wash tray feed was 11 gpm and wash tray underspray was about 2.4 gpm.

The process for this study was performed as follows: Flue gas from a pulverized coal fired boiler containing about 2 grains of fly ash per dry standard cubic foot and about 600–1,000 ppm of sulfur dioxide was passed to a venturi scrubber where the gas was contacted with a recycle tank slurry flow of 45 gpm. The high gas velocity in the venturi throat (200 ft/sec) atomized the liquor into fine droplets which contacted the fly ash fine particles and removed them from the gas stream. The gas and slurry were then directed to the absorption spray vessel. The flue gas passed through the slurry absorption spray (55 gpm), where most of the sulfur dioxide was removed. The gas temperature dropped to about 125° F. and the gas was water saturated. The flue gas with the entrained droplets was then passed through the wash tray, where the entrained slurry droplets were removed from the gas bubbles. The gas stream was then passed through the mist eliminator where most of the liquid mist was removed.

The gas was then heated to a temperature of about 175° F. by means of heat exchange with a contribution of about 12° F. resulting from the I.D. fan. The clean reheated flue gas was then exhausted to the atmosphere through a stack.

The slurry from the venturi tank and from the absorption spray was directed by gravity into a recycle tank.

A stream of about 2–3 gpm of slurry was bled from the recycle tank to the oxidizer, where compressed air was bubbled through the stream to oxidize all of the magnesium sulfite and bisulfite into magnesium sulfate, as well as minor amounts of calcium sulfite and bisulfite to calcium sulfate. The overflow stream from the oxidizer was divided into a first stream of about 1 gpm which was directed to a thickener tank or settling tank, while a second stream of about 2 gpm was directed to a reactor tank. The first stream was employed to maintain a constant solids inventory in the system. With the present parameters, about 12% suspended solids was maintained. The solids provided for nucleation in the reaction tank for rapid precipitation of supersaturated calcium sulfate, thus avoiding scaling in the reactor tank.

The underflow or sludge from the thickener was pumped about every two hours into a barrel from which the supernatant was pumped into the recycle tank and the sludge containing about 50% moisture was pumped to an outside pond.

Into the reactor tank was directed Type S hydrated dolomitic lime and Type N hydrated lime as dry solids. If desired, slurries could be employed in place of the dry solids and preferably the hydrated lime would be hydrated in the same manner as the Type S hydrated dolomitic lime. The ratio was about three parts by weight of hydrated lime to one part by weight of hydrated dolomitic lime. For an inlet flue gas sulfur dioxide content of about 1,050 ppm, the feed rate of hydrated dolomitic lime was about 35 g/min, while the feed rate of hydrated lime was about 140 g/min to provide a final flue gas sulfur dioxide content of about 50 ppm (0.1 lb sulfur dioxide per million BTU heat input). For a sulfur dioxide inlet flue gas content of about 750 ppm, with the same sulfur dioxide emission level, the feed rate was about 28 g/min hydrated dolomitic lime and 90 g/min hydrated lime.

In the reactor tank, the soluble magnesium sulfate reacted with the calcium hydroxide to produce magnesium hydroxide and calcium sulfate, both of low solubility. The effluent from the reactor rank was pumped to the recycle tank at a rate of about 2.5 gpm. Conveniently, the addition of the hydrated dolomitic lime and hydrated lime may be followed by the pH of the mixture in the reactor tank, with the pH in the reactor tank varying between 9 and 10, which provides a pH in the recycle tank of between about 6 and 7.

The ratio of hydrated dolomitic lime to hydrated lime is varied depending upon the magnesium sulfate concentration in the thickener tank underflow, increasing the ratio when the magnesium sulfate concentration is less than 40,000 ppm and vice versa.

To insure the desired solids content in the reactor a portion of the underflow from the thickener may be continuously transferred to the reactor tank.

It should be noted that the fly ash had residual basicity as basic calcium and reacted with the magnesium sulfate in the liquor to produce magnesium hydroxide and calcium sulfate.

The amount of base provided as hydrated dolomitic lime and hydrated lime will vary depending upon the sulfur dioxide concentration and the flue gas. At 700–750 ppm of sulfur dioxide, approximately 90% of stoichiometric is employed, while at 1050 ppm of sulfur dioxide, approximately 100% of stoichiometric is employed. However, if the fly ash were to be removed and the sludge dewatered to about 20% moisture, the total base added would be about 110% of stoichiometric.

In accordance with the above described procedure two runs were carried out, where the base was provided as a mixture of Type S hydrated dolomitic lime and hydrated lime in one run, as compared to another run where base was provided as hydrated lime. The following table indicates a number of the parameters of the run over one day and the results.

TABLE I

|  | average $SO_2$ ppm | | lbs $SO_2$ MBTU |
|---|---|---|---|
|  | inlet | outlet | outlet |
| Type S Hydrated Dolomitic Lime & Hydrated Lime | 1039 | 50.7 | 0.101 |
| Hydrated Lime | 920 | 394 | 0.79 |

Lower outlet $SO_2$ levels than 0.79 lbs $SO_2$/M BTU would be difficult to realize without scaling under the process conditions selected when hydrated lime was employed. However, the use of Type S hydrated dolomitic lime and hydrated lime together in the reactor tank made it possible to operate in the scrubber with soluble magnesium sulfite (a very good $SO_2$ absorbent) and, therefore, to achieve higher $SO_2$ removal efficiency without scaling.

The subject wet scrubber method employing the Type S hydrated dolomitic lime has a number of advantages which are extremely important in a system where very large amounts of materials are required, large volumes of liquid must be pumped and recycled, and the waste material discharged should be relatively free of pollutants. In the subject method, very high sulfur dioxide removal efficiency is achieved to a level of less than 0.2 pound $SO_2$/per million BTU emission rate. In addition, the sulfur dioxide is captured as magnesium bisulfite, which is then oxidized to magnesium sulfate, which greatly reduces or eliminates the problem of scaling which is typically encountered when calcium hydroxide reacts with sulfur dioxide.

The subject wet scrubber method has relatively low operating costs, because it involves relatively low pumping rates, relatively small material transfers, and high alkali utilization. Because of the greater efficiency, smaller equipment may be employed, so that capital costs are reduced.

A further advantage is that cooling tower blowdown water may be employed as make-up water. Because the cooling tower blowdown water has relatively high levels of dissolved calcium, the potential for supersaturation of calcium in the medium is enhanced when calcium hydroxide is employed, with greater possibilities for scaling. In the subject system, where the calcium hydroxide exists in the reactor only to react with magnesium sulfate to provide magnesium hydroxide, together with calcium sulfate which is substantially insoluble and inert, the problem of supersaturation potential of the calcium is greatly reduced, and thus the potential for scale formation is reduced.

In the next study, Type S hydrated dolomitic lime was used in a dry system. To demonstrate the efficiency of the subject system, a number of runs were carried out in a spray dryer pilot plant to compare the results with Type S hydrated dolomitic lime and Type N hydrated lime. The pilot test system was designed to treat 400 acfm of flue gas. The system consisted of: (1) an air heater including a heater shell and a gas burner to produce the hot flue gas; (2) a spray dryer to remove sulfur dioxide; (3) a fabric filter to collect dry FGD solids, as well as remove additional sulfur dioxide; (4) an induced draft fan to move the flue gas through the system; (5) a feed tank with an agitator and a metering pump to supply the alkaline slurry to the system; (6) a sulfur dioxide cylinder on the weight scale and a delivery system to provide the amounts of sulfur dioxide to the flue gas for tests at different inlet sulfur dioxide concentration; and (7) duct work for flue gas transport.

The pilot spray dryer was an insulated Stork-Bowen standard laboratory unit conical type, 2'-6" diameter x 2'-9" high cylinder section with 65° conical bottom equipped with a variable speed rotary disc atomizer as manufactured by Stork-Bowen Engineering, Inc. (Type AT-4 complete with 0.5 hp air turbine and Type CSC 2" atomizer rated maximum 50,000 rpm at no load). The rotary atomizer can be replaced by a two-fluid type nozzle atomizer located in the drying chamber with the head (co-current air flow) provided with different types of spray nozzles.

The spray dryer is also provided with a process air-heater. The hot flue gas, into which is injected sulfur dioxide, enters the spray dryer chamber from an overhead plenum and is then directed to fixed-vanes, which impart turbulent spiral gas flow into the chamber.

The slurry fed to the atomizer disc or to the two fluid nozzle atomizer is dispersed directly into the gas flow, providing an optimized gas-liquid contact. The turbulent mixing of a flue gas and finely atomized droplets of absorbent slurry effects rapid sulfur dioxide absorption and evaporation of the droplets. The scrubbed flue gas containing fine dry particles leaves the dryer via an outlet elbow and duct work to the fabric filter.

During testing, conditions are held as fixed values until the system operation responses, particularly sulfur dioxide removal efficiency and temperature drop, are measured. System responses to changes in stoichiometry are observed on a sulfur dioxide analyzer, which samples both inlet and outlet streams from the spray dryer system. A close material and heat balance is observed. Thus, the flue gas flow rate through the spray dryer is determined, based on the heat balance around the spray dryer. The slurry concentration is measured and the weight of the slurry flowing into the spray dryer is recorded every 10 minutes. The amount of sulfur dioxide injected into the flue gas is also regularly recorded.

In demonstrating the high efficiency of the Type S hydrated dolomitic lime, using the commonly employed Type N hydrated lime, the following variables were studied: Absorbent/sulfur dioxide stoichiometry; inlet sulfur dioxide concentration; inlet gas temperature; outlet gas temperature; and type of atomization.

The range of pilot test variables is set forth in the following table.

TABLE II

| Pilot Test | Range | |
|---|---|---|
| Variables | Min. | Max. |
| inlet $SO_2$ conc., ppm | 500 | 2,700 |
| stoichiometry in, | | |
| absorbent/$SO_2$ mole ratio | 0.5 | 2.4 |
| inlet flue gas, T °C. | 140 | 160 |
| outlet flue gas, T °C. | 65 | 80 |
| inlet flue gas flow rate, ACFM | 250 | 400 |
| absorbent slurry feed conc., in. % | 5.0 | 15.0 |
| recycle ratio, | | |
| recycle/make up absorbent lb/lb | 0 | 2 |
| rotary atomizer | | |
| disc diameter, in | 2 | 2 |
| disc speed, rpm | 30,000 | 40,000 |
| two-fluid nozzle atomizer | | |

TABLE II-continued

| Pilot Test | Range | |
|---|---|---|
| Variables | Min. | Max. |
| type of mixing | internal | external |

Based on the individual data obtained, the following overall results were observed and conclusions derived.

Maintaining the inlet sulfur dioxide concentration at 1,000 ppm, while employing a stoichiometric ratio of absorbent/$SO_2$ in the range of 0.67–0.75, the Type S hydrated dolomitic lime removed 82.5% of the sulfur dioxide, while the Type N hydrated lime removed only 67.5%.

Also, the high sulfur dioxide removal does not appear to depend upon the sulfur dioxide concentration of the inlet flue gas when the Type S lime is used at a stoichiometric ratio in the range 1.2–1.5. However, the sulfur dioxide removal shows a considerable fall-off in performance at higher sulfur dioxide concentrations in the inlet flue gas, when Type N hydrated lime is used as shown by the following table.

TABLE III

| Inlet $SO_2$ | $SO_2$ Removal, % | |
|---|---|---|
| ppm | Type S | Type N |
| 500 | 86.5 | 75.0 |
| 1,000 | 84.5 | 67.5 |
| 1,500 | 83.5 | 59.0 |
| 2,700 | 82.0 | — |

The Type S hydrated lime shows only a very small drop-off in efficiency with increasing amounts of sulfur dioxide, while by contrast the Type N hydrated lime suffers substantial inefficiency to the point of questioning its utility with effluents from high sulfur fuel.

The Type S lime was shown to have a high percent utilization in the spray dryer at a mole stoichiometric ratio of 1.2–1.5, as contrasted with the Type N hydrated lime. This is particularly evident where recycling of the effluent product is added to the fresh hydrated lime. Since the Type S hydrated dolomitic lime is efficiently used, the residual neutralizing values in the effluent product are relatively low and since the fresh Type S hydrated dolomitic lime is already at high efficiency at sulfur dioxide removal, there is little enhancement in sulfur dioxide removal.

By contrast, there is significant enhancement when recycling the FGD product in conjunction with the Type N hydrated lime, since there is a substantial amount of residual neutralizing value in the FGD product. With Type N hydrated lime, it becomes important economically to recycle the FGD product. However, the need to recycle the FGD product creates many concerns. The FGD product includes fly ash and is therefore very abrasive, so that it can lead to rapid deterioration of equipment. Furthermore, recycling requires additional equipment in that the recycled product has to be blended with the Type N hydrated lime.

Another variable of importance in the spray dryer is the temperature approach to adiabatic saturation. At adiabatic saturation, the particles remain wet and stick to the equipment and clog the filter. In addition, at lower temperatures the effluent loses its buoyancy and settles to the earth, rather than rising and being dispersed by prevailing winds. It is therefore important to be able to work at a temperature sufficiently higher than the adiabatic saturation temperature to avoid these concerns and reduce the need for careful monitoring. The following table compares Type S and Type N limes at two different adiabatic saturation temperatures.

TABLE IV

| Inlet $SO_2$ | Temperature* | $SO_2$ Removal, % | |
|---|---|---|---|
| ppm | Δ °C. | Type S | Type N |
| 550 | 18 | 86.2 | 73.4 |
| 500 | 13 | 87.5 | 77.5 |

*°C. above adiabatic saturation.

The above data demonstrate that the efficiency of $SO_2$ removal when using Type N hydrated lime is increased as the saturation adiabatic temperature is approached. However, there is little difference in the efficiency of the Type S hydrated lime at the two different approaches to adiabatic saturation. Thus sulfur dioxide removal can be efficiently performed at a substantially higher exit gas temperature than with Type N hydrated lime.

In performing the study, the pilot plant was operated in the following manner. The stream of the flue gas amounted to 1,220 lbs/hr and had a sulfur dioxide concentration (based on volume) as indicated, with the gas free of fly ash. At 2.25 lbs/hr, hydrated lime is added as a 5 weight percent suspension, except when studies were being made with higher stoichiometric ratios, when 10 weight percent suspensions were employed. Where recycling was employed, the suspension had 20 weight percent solids, 10 weight percent of the fresh lime and 10 weight percent of the FGD recycled product. The temperature of the flue gas fed to the spray dryer was 155° C. and the temperature leaving the spray dryer was 70° C., with a residence time of 3.3 sec. The effluent temperature was modified for the study of the effect of approach to adiabatic saturation, lowering the effluent temperature from 70° C. to 65° C. An effluent temperature of 70° C. is 18° C. above the saturation temperature of the gas.

Based on the observed results, the use of Type S hydrated dolomitic lime provides a highly efficient and economical process for the removal of sulfur oxides from the burning of both high and low sulfur containing fuel. The efficiency is achieved at moderate stoichiometric ratios without requiring recycling of partially spent particles. At a stoichiometric ratio of 1.2–1.5, the Type S hydrated dolomitic lime is far superior to the Type N hydrated lime, regardless of the sulfur dioxide concentration in the inlet flue gas. The high performance of sulfur dioxide removal at low stoichiometric ratios can be accomplished at a higher approach to adiabatic saturation, avoiding the requirements of flue gas bypassing for reheating and limiting the risk of particle build-up and clogging in the spray dryer. The very fine porous particles which one can obtain with the Type S hydrated dolomitic lime in the feed slurry expose a very large surface area for reaction with efficient diffusion of sulfur dioxide into the droplets and efficient utilization of the neutralizing values present. A finer atomization is achieved with the Type S hydrated dolomitic lime, permitting faster reaction and shorter residence times, so that equipment size can be reduced as compared to the use of Type N hydrated lime. Furthermore, because of the high efficiency in utilization of the neutralizing values in a single pass, no recycling of the FGD product is required. This avoids the problems of abrasion resulting from the fly ash which is present in the recycled product, as well as the additional equipment associated with the recycling of the FGD product.

The use of the Type S hydrated dolomitic lime in a spray dryer becomes essential, both for efficiency and economic reasons, as high sulfur fuels are burned and EPA regulation requirements continue to reduce the permissible amounts of sulfur dioxide in the effluent gas. The economic and efficient use of the Type S hydrated dolomitic lime greatly expands the fuel types which can be used without pre-treatment to extract the sulfur which is present in the fuel. It is evident from the above results, that Type S hydrated dolomitic lime provides numerous efficiencies and advantages in the removal of sulfur dioxide from effluent gases.

Although the foregoing invention has been described in some detail by way of illustration and example for purposes of clarity of understanding, it will be obvious that certain changes and modifications may be practiced within the scope of the appended claims.

What is claimed is:

1. A method for removing sulfur dioxide from sulfur dioxide containing flue gas resulting from the burning of sulfur containing fossil fuel, said method comprising:
   in a spray dryer introducing into a stream of said flue gas fine particles of an aqueous dispersion of Type S hydrated dolomitic lime in an amount sufficient to remove at least about 70% of the sulfur dioxide present in said flue gas, while reducing the temperature of said flue gas from 240°–350° F. to not lower than a temperature in the range of about 145° to 165° F., wherein the amount of the aqueous dispersion introduced is less than the amount which would result in condensation at said lower temperature; and
   separating the resulting substantially dry particles from the effluent.

2. A method according to claim 1, wherein the sulfur dioxide content of said flue gas is in the range of about 0.04%–0.4% by volume.

3. A method according to any of claim 1 or 2, wherein said Type S hydrated dolomitic lime is in a stoichiometric ratio to said sulfur dioxide in the range of about 1.2–1.5.

* * * * *